April 5, 1960   R. H. SIMS   2,931,851
SNAP IN RETAINER FOR WIRING HARNESS
Filed March 12, 1956
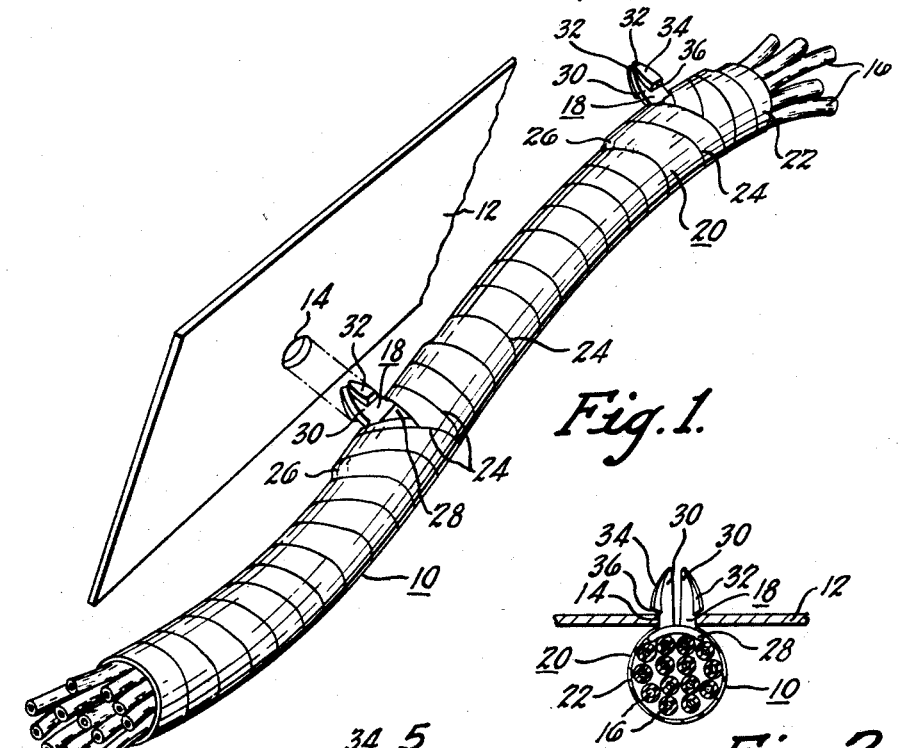
Fig. 1.
Fig. 2.
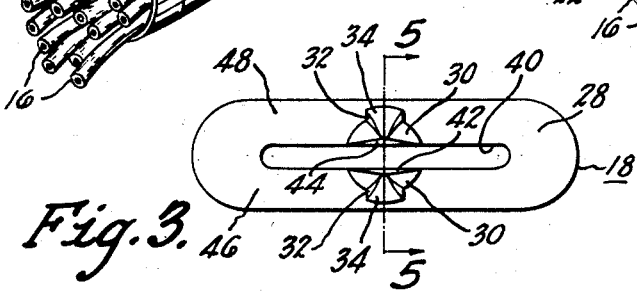
Fig. 3.
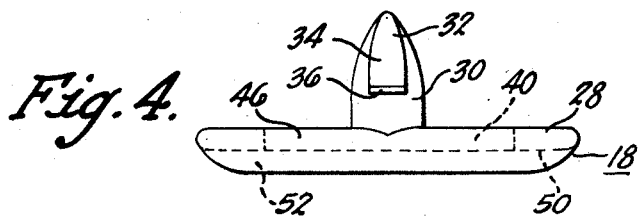
Fig. 4.
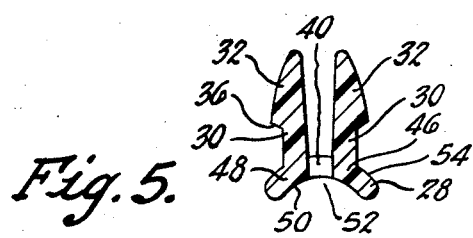
Fig. 5.
INVENTOR.
ROBERT H. SIMS
BY
Craig V. Morton
HIS ATTORNEY

United States Patent Office 2,931,851
Patented Apr. 5, 1960

2,931,851

SNAP IN RETAINER FOR WIRING HARNESS

Robert H. Sims, Oak Park, Mich., assignor to General Motors Corporation, Detroit, Mich., a corporation of Delaware Application March 12, 1956, Serial No. 571,072

7 Claims. (Cl. 174—72)

This invention relates to a fastening means for mounting wiring harnesses, and, more particularly, to a resilient snap in retainer constructed to receive a wiring means and retained therewith by a covering means used to encase a wiring harness.

In assembling wiring harnesses with vehicle bodies, it is conventional practice to utilize spring clips at various locations on the body which are either snapped into holes or are welded or bolted into place, after which the harness is inserted into the clip. In such assemblies, assemblers often do not insert the harness in all of the clips provided and also they will clip the harness in the wrong location. With improper location, the result is that in the final hook-up of the wiring harness will not fit on the vehicle as intended.

An object of this invention is to provide a fastener per se having a body portion contoured to support a wiring harness and having mounting projections thereon.

Another object is to provide a snap in retainer for wire harness mountings capable of being built into a harness as the harness is being wrapped so that only a mounting element projects from the harness noticeable for proper insertion in a vehicle body assembly.

Another object is to provide a combination wiring harness and clip pre-assembled with a wrapping or covering means to afford support through a covered contoured support means and quick attachment and detachment in a vehicle body by protruding members.

Another object is to provide a wiring harness assembled with a plastic fastening means projecting out of the harness in predetermined space relationship for proper attachment and detachment in a final hook-up fitting to a vehicle body.

Further objects and advantages of the present invention will be apparent from the following description, reference being had to the accompanying drawings wherein a preferred embodiment of the present invention is clearly shown.

In the drawings:

Figure 1 is a perspective view of a fragment of a combination wiring harness with fastening means in accordance with the present invention shown adjacent an apertured mounting panel.

Figure 2 is a cross-sectional elevational view of the combination of Figure 1 in assembled relationship with the apertured panel showing an unsectioned end view of the fastening means at a section of the wiring harness through a diameter of the aperture or hole in the mounting panel.

Figure 3 is a plan view of the fastening means per se of the present invention used in the combination wiring harness shown in Figures 1 and 2.

Figure 4 is a side elevational view of the fastening means shown in Figure 3.

Figure 5 is a cross-sectional elevational view taken along line 5—5 of Figure 3 of the fastening means showing the contoured shape of the body portion and projecting tang or barbed element normal thereto for mounting the combination wiring harness.

The aforementioned and other objects are accomplished in the present invention by a snap in retainer, fastening means or member, fastener or clip formed of resilient material, for example, spring steel, or a plastic, such as molded nylon, capable of being pre-assembled with a wiring harness using a covering, casing or wrapping means for encasing the harness.

The fastener or fastening means comprises a support means or body portion having greater length than width formed normal to a mounting member or element, tang or projection. The mounting element comprises a fastening device which may be in the form of resilient arms or legs, the free ends of the legs may be shaped to conform in cross section to any shape of opening or seating surface on a vehicle body. The body portion provides a mounting surface contoured or formed with a longitudinal concave or semi-cylindrical recess or channel on one side thereof. A longitudinal aperture or slot for added flexibility may be molded extending from the recess to the opposite side of the body portion.

Projecting normal to or substantially at right angles and outwardly from the body or support portion are the resilient arms or legs, mounting members, elements, tangs or projections. The legs are molded at their free ends forming a barb, abutment, snap in nib or an outwardly inclined guide surface merging into an inwardly inclined cam shoulder. The legs may be formed with a general outer configuration resembling a teardrop or conical structure which is divided or split in a longitudinally extending transverse central plane, cut out such that the inner surfaces of the semi-conical legs formed thereby are coextensive or flush with the inner surfaces of the longitudinally extending opening or slot formed centrally throughout the support portion. Forming the legs with the body portion about the central longitudinal opening therein provides snap in mounting resiliency.

The support means or body portion is contoured as mentioned above to complement or mate with a longitudinal peripheral portion of a plurality of wires bundled as an assembly in a group. The body portion extends a sufficient length at substantially right angles to the legs of the fastener to provide a good mounting surface for the group of wires. The fastening means may be provided at predetermined or periodic intervals on the length of the wiring harness using a casing, covering, or wrapping means normally encasing or grouping together the bundled wires of the harness. The wrapping means may be in the form of a tape, narrow in width, thin, flexible, stretchable, and resilient, wound progressively longitudinally with overlapping edge portions tightly covering the grouped wires or conductors.

The characteristics outlined concerning the wrapping means provide a harness free of gaps or openings when wound. Thus no foreign material such as oil or dirt can enter the harness through the wrapping means. The tape conforms readily with irregularities encountered in wrapping the harness. Such an irregularity occurs about the body portion of the fastening means even though the contoured shape complements the bundled wires for minimum irregularity. The tape is wound tightly to seal up the harness in covering the bundled wires and a plurality of the fastening means may be provided at spaced, periodic intervals. When the tape is wound as described, the mounting elements protrude from the wiring harness noticeable for proper insertion in a vehicle body assembly. This facilitates proper fitting of the harness in the final hook-up and results in savings of time, cost and material. Use of the wiring harness and fastening means of the present invention assures proper location in the hook-up as desired resulting in quicker and better assembly of wiring in bodies.

With particular reference to Figure 1, the numeral 10 generally refers to a completely assembled combination wiring harness with fastening means in accordance with the present invention. The complete assembly 10 is shown adjacent a mounting panel 12 having an aperture 14 at a predetermined location therein. The panel 12 may be part of a vehicle body with the location of the hole or aperture 14 being determined by a wiring hook-up including the fragmentary portion of the harness combination 10. A plurality of wires or conductors 16 are bundled into a group assembly which is then supported by a portion of a fastening means, retainer, fastener or clip generally indicated by the numeral 18. A plurality of such fasteners 18 may be provided in the completely assembled harness 10 at predetermined spaced intervals as shown.

Figure 1 also shows the casing, covering or wrapping means generally indicated by the numeral 20 encompassing the harness. The wrapping means comprises a tape 22, narrow in width, thin in cross section, flexible, stretchable, and resilient, wound progressively longitudinally with overlapping edge portions 24. The tape 22 tightly covers the grouped wires or conductors 16 and seals or closes gaps even at irregular peripheral portions such as at locations indicated by the numeral 26 indicated adjacent the fasteners 18. The irregularity 26 results from a body portion 28 of each fastener 18. The body portion 28 is only partially visible in the completed assembly shown in Figure 1 adjacent a mounting element, tang or projection 30. The projection 30 is formed or molded normal to or at substantially right angles and outwardly from the body or support portion 28. A pair of projecting lines represent the alignment of the mounting element, legs or arms 30 as a fastening device through barbs, abutments, or snap in nibs 32 with the hole 14 of panel 12. Each barb 32 is formed of an outwardly inclined guide surface 34 merging into an inwardly inclined cam shoulder 36.

Figure 2 is a cross-sectional elevational view of the combination shown in Figure 1 in assembled relationship with the apertured panel 12. Figure 2 shows an unsectioned end view of the fastening means 18 with a section of the wrapping means 20 or tape 22 and wires 16 through the panel 12 and hole 14 at a diameter of hole 14 transverse to the longitudinal axis of the wires 16 in the assembled position. The body portion or support means 28 of the fastener 18 can be seen positioned with the wires 16 encompassed by the casing generally indicated by the numeral 20 or by wrapping tape 22 specifically. The legs or arms 30 with barbs 32 including the outwardly inclined surface 34 and cam shoulder 36 are shown fitted into locking engagement with the panel 12 through the aperture 14. Barbs 32 are located on non-adjacent outer surfaces on the free ends of arms 30.

Figure 3 is a top or plan view of the fastening means 18 per se. The body portion or support means 28 of greater length than width is formed normal to the tangs or projections 30. A longitudinal aperture or slot 40 is formed or molded with the body portion 28. The slot 40 provides added flexibility to the arms or legs 30.

While the fasteners 18 may be clips formed of resilient materials, for example, spring steel, or a plastic, such as molded nylon, the preferred form is illustrated as being a molded plastic material. The legs or mounting element 30 may be formed with a general outer configuration resembling a teardrop or conical structure which is divided or split in a longitudinally extending transverse central plane, cut out such that the inner surfaces 42 and 44 of the semi-conical legs 30 formed thereby are co-extensive or flush with the inner longitudinal surface on opposite shoulders 46 and 48, respectively, of support means or body portion 28 formed by slot 40. The slot 40 provides an elongated doughnut structure for the body portion 28 as seen in the plan view. Slot 40 extends through body portion 28 from the convex to the concave surface thereof.

Figure 4 is a side elevational view of the fastening means 18 shown in Figure 3. The side view clearly shows the tear-drop or conical structure with which the mounting element 30 is molded. This structure is adapted to facilitate fixing the fastener 18 into the round hole 14 of plate 12 in the preferred embodiment of the present invention. However, the configuration may be modified to facilitate assembly with any configuration of the aperture or mounting means of the panel 12.

Figure 5 is a cross-sectional elevational view taken along line 5—5 of Figure 3 of fastening means 18 showing the contoured shape of the body portion 28 and tangs 30 normal thereto. The body portion 28 provides a mounting surface 50 contoured or formed with a longitudinal concave or semi-cylindrical recess or channel 52 on one side thereof. The surface 54 of the body portion 28 on the side thereof opposite the mounting surface 50 is contoured or formed with a longitudinal convex curvature so as to keep the irregularity 26 in the harness assembly 10 to a minimum as shown in Figure 1.

The mounting surface 50 is contoured to complement or mate with a longitudinal peripheral portion of the plurality of wires 16 bundled as an assembly in a group. Because the body portion 28 extends a sufficient length longitudinally at substantially right angles to the legs 30 of the fastener 18, a good mounting surface 50 is provided by channel 52 as indicated.

In assembling the combination harness 10 of Figure 1, the tape 22 is wound tightly progressively around wires 16 to a first fastener 18. Fastener 18 is wound into the combination by wrapping the tape 22 around the body portion 28 and contoured shoulders 46 and 48 thereof. The tape 22 is then wound progressively longitudinally along wires 16 with edge portions of tape 22 overlapping to any number of additional fasteners 18 at periodically spaced intervals longitudinally of wires 16 as desired for mounting at predetermined locations similar to aperture 14 in mounting panel 12. After encasing each fastener 18, the tape is further wound progressively along the periphery of wires 16. The fasteners 18 are snapped into a hole such as 14 to locate and hold a harness in installed position. Fasteners 18 are removed from holes by applying pressure thereto under the taped body portion 28.

While the embodiment of the present invention as herein disclosed constitutes a preferred form, it is to be understood that other forms might be adopted.

What is claimed is as follows:

1. In a wiring harness having a plurality of bundled wires with a wrapping, the combination of a plurality of bundled wires disposed in longitudinal arrangement forming an assembly, a built in attaching member pre-assembled with said harness and having a longitudinally extending body portion disposed only on one side of said bundled wires and including a projecting element normal to the body portion, said element comprising a fastening device to secure the harness to a mounting surface, and a casing wrapped complementary to exterior contour of both the wires and said attaching member progressing longitudinally of the bundle and completely enclosing said body portion of said pre-assembled attaching member by progressive layering of the wrapping, relative to said bundled wires the said element of said pre-assembled attaching member extending through the wrapping.

2. A preassembled wiring harness comprising a plurality of electrical conductors grouped in a longitudinally extending bundle assembly, a built-in fastening means including a body portion extending longitudinally relative to the bundle assembly and having greater length than width relative to said longitudinally extending bundle assembly, projections for mounting the harness extending normal to said body portion, said projections having snap in nibs thereon, said body portion including a shoulder contoured to complement contour of both the bundled conductors, and wrapping means wound progressively around said conductors longitudinally of the bundle assembly and covering as well as enclosing the body portion of said built-in fastening means between said wrapping means and said bundled conductors, the said projections extending through the wrapping means.

3. The combination, comprising, a supporting panel having a hole at a predetermined spaced location therein, a molded plastic snap in retainer for pre-assembly with wiring and including a support portion semi-arcuate in shape and having greater length than width relative to the wiring, a longitudinally extending concave support surface formed on one side of said support portion, resilient arms projecting from said support portion normal thereto shaped to fit in the hole of said supporting panel, abutments formed at the free ends of said arms for locking said retainer to said support panel, a plurality of bundled wires disposed in longitudinal arrangement forming an assembly complementing the concave support surface, and a wrapping tape progressively wound around said bundled wires encasing said support portion on an exterior side opposite the side of the concave support surface completing the pre-assembly longitudinally with said wires, only said arms protruding noticeably out of said wrapping tape at periodic spaced intervals.

4. A harness clip capable of being built into a pre-assembled wiring harness comprising, a contoured body portion oblong in shape longitudinally relative to the wiring harness and including a concave wire-supporting channel surface extending longitudinally thereof with a central slotted opening through said body portion from the bottom of the channel surface to the opposite side of said body portion, a teardrop-shaped projection molded normal to said body portion extending laterally outwardly from the side of the body portion opposite the channel surface, said projection being split into halves by a longitudinally extending cut out in a transverse central plane paralleling the slotted opening that increases flexibility of both said halves and said body portion, and an abutment formed on diametrically opposite sides of said projection at the free ends thereof by a molded outwardly inclined guide surface merging into an inwardly inclined cam shoulder for mounting said clip, said body portion with increased flexibility being adapted to be enclosed completely within a preassembled wiring harness with only said teardropped projection being noticeable.

5. A wiring harness comprising, a plurality of electrical conductors grouped in a longitudinally extending bundle, a built-in fastening means including a body portion extending longitudinally relative to the conductors and having greater length than width relative to the longitudinally extending bundle, projections for mounting the harness extending normal to said body portion, said projections having abutments thereon, said body portion including a shoulder contoured to complement the bundled conductors with a minimum irregularity on the surface therewith, and wrapping means wound progressively around said grouped conductors longitudinally of the bundle assembly and covering as well as enclosing the body portion of said fastening means relative to the longitudinally extending bundle, the said projections noticeably extending through the wrapping means, said wrapping means consisting of a tape, narrow in width, thin, flexible, stretchable, and resilient, wound progressively longitudinally with overlapping edge portions tightly covering both the grouped conductors and the irregularity on the surface therewith at the contoured shoulder of said body portion of the built-in fastening means.

6. A preassembled wiring harness and combined built-in fastening means for connection to mounting apertures at predetermined intervals, comprising, multiple wires bundled into a longitudinally extending group forming a core with an outer periphery curved in shape, the built-in fastening means including a plurality of plastic snap in retainers each provided with a body portion curved in shape to complement the outer periphery of the core and extending a predetermined distance longitudinally relative to the wires, said retainers being located periodically along said bundled wires and having said body portion integral with an outwardly extending resilient arm means projecting laterally and transversely relative to both said longitudinal body portion and said multiple wires, and a casing completely enclosing said wires and the body portions of said retainers for the predetermined longitudinal distance so that only said resilient arm means projects periodically and noticeably from said preassembled wiring harness and combined built-in fastening means for mounting at predetermined intervals relative to mounting apertures.

7. In a wiring harness having a plurality of conductors grouped in a longitudinally extending bundle assembly and having a casing completely enclosing said conductors as well as having a fastening device to secure the harness to a mounting surface, the improvement which comprises having an arcuate and longitudinally extending body portion of said fastening device preassembled and built-in relative to both said casing and said longitudinally grouped conductors, said fastening device including outwardly extending resilient arm means projecting laterally and transversely relative to both said longitudinal body portion and said longitudinally grouped conductors, said arm means projecting periodically and noticeably from said preassembled wiring harness and built-in body portion of the fastening device for mounting at predetermined intervals relative to apertures along a mounting surface, said body portion having a shape to complement contour of both the bundled conductors and said casing that covers and encloses the body portion relative to said bundled longitudinal conductors.

References Cited in the file of this patent

UNITED STATES PATENTS

| 838,482 | Weed | Dec. 11, 1906 |
| 1,268,466 | Hunter | June 4, 1918 |
| 2,196,417 | Kelsen | Apr. 9, 1940 |
| 2,299,140 | Hanson | Oct. 20, 1942 |
| 2,682,384 | Eichelberger | June 29, 1954 |

FOREIGN PATENTS

| 1,111,742 | France | Nov. 2, 1955 |

OTHER REFERENCES

Publication I. "Plastic Fasteners" (Cathcant), published in Fasteners, published by Industrial Fasteners Institute, 1517 Terminal Towers, Cleveland, Ohio (pages 3 and 4 relied on).